(No Model.)
T. A. GALT.
LAWN RAKE.
No. 529,901. Patented Nov. 27, 1894.
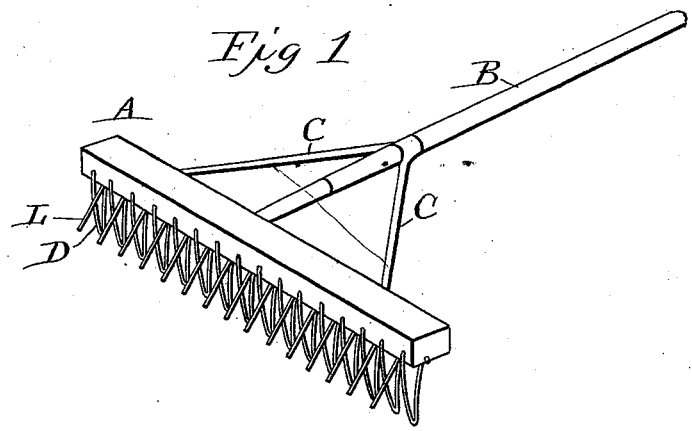
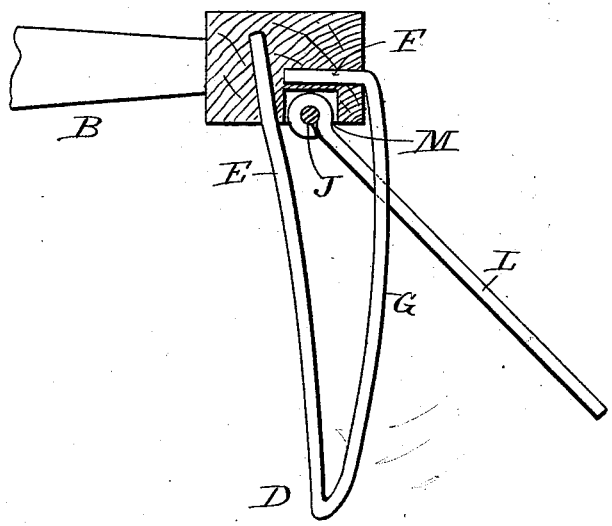
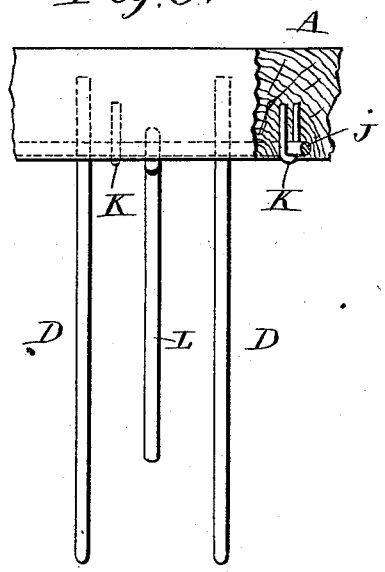
WITNESSES
INVENTOR
Thomas A. Galt,
per J. G. Manahan,
his Attorney

UNITED STATES PATENT OFFICE.

THOMAS A. GALT, OF STERLING, ILLINOIS.

LAWN-RAKE.

SPECIFICATION forming part of Letters Patent No. 529,901, dated November 27, 1894.

Application filed July 18, 1894. Serial No. 517,882. (No model.)

*To all whom it may concern:*

Be it known that I, THOMAS A. GALT, a citizen of the United States, residing at Sterling, in the county of Whiteside and State of Illinois, have invented certain new and useful Improvements in Lawn-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in lawn rakes and pertains more especially to the provision of a peculiarly formed looped wire tooth; the method of seating the latter and also to a series of pendants adapted to swing, or be forced between said teeth for the purpose of removing any substance adhering to the latter.

My invention, while primarily advantageous in the raking of lawns, is also adapted for use as an ordinary rake. The peculiar mode of seating the aforesaid teeth renders it feasible to employ a tooth of very slight weight, and yet retain sufficient power in the teeth.

I attain the advantages before mentioned, by the construction shown in the accompanying drawings, in which—

Figure 1 is a perspective of a rake embodying my invention. Fig. 2 is a vertical section through head A, near handle B. Fig. 3 is a detail of the cleaners and their suspending rod.

Similar letters refer to similar parts throughout the several views.

A is the rake head, which for lightness, I preferably construct of wood.

B is the ordinary handle, and C the usual lateral braces extending therefrom to the head A.

D D are the teeth which are formed of a single piece of wire of suitable size, looped near its center and bent back upon itself in slightly divergent lines as shown in Fig. 2. The upper end of the rear limb G of said tooth is bent toward the front limb E of the latter, in a substantially horizontal position. The front or straight limb E of the tooth D is inserted into the head A from the lower surface of the latter a sufficient distance to permit the bent end F of the rear limb G of said tooth, to enter suitable openings formed horizontally in the lower portion of the head A from the outer or rear side of said head. There is sufficient elasticity in the tooth D to permit the limb G to be drawn back and pass up behind the rake head A in the process of inserting the front limb E in its vertical seat. After the crook F of the limb G is sprung into its opening, the elasticity of the tooth retains it in place, and the backward pressure on the tooth D in the operation of the rake, further tends to hold the crook F in its seat. It will be observed that the limb E is slightly concaved to the rear in its operative portion and that the lower or looped end H of the tooth D is given a slightly forward gather.

The tooth D is seated with its limbs E and G in line with each other, and in the line of pressure upon the rake when in use, and the advantage of the peculiar construction and seating aforesaid of the tooth D is that each of the limbs E and G reinforces the other, and imparts additional resisting force thereto, in the forward and backward movements of the rake, that is to say that each of said limbs E and G serves as a brace for the other. The seating of the teeth D with the limb G behind the limb E and in the line of movement of the rake has not only the advantages before claimed, but it also secures an engaging lower point to the tooth D of no greater width than the diameter of the wire used. The looped formation of the engaging end of the tooth D prevents the latter from unduly entering the surface of the earth, which would both increase the labor and injure the sod. The narrow formation of the tooth D, when presented to the work with its limbs in the line of movement, enables said teeth to readily enter among the stocks and grass, and penetrate below the loose material.

A wire J is countersunk longitudinally in the lower surface of the head A, and held therein by short staples K. The pendants or cleaners L are respectively loosely coiled at their upper ends around the rod J between each of the teeth D. A transverse recess M is cut in the head A at the point of attachment of the cleaners L, to permit said cleaners to oscillate freely on the rod J. The cleaners L are longer than the teeth D, and swing freely on the rod J, passing respectively between the teeth D, at each full oscillation.

In using the rake, the usual movement of throwing it out, or forward, causes the cleaners L to swing through and beyond the rake head. As the rake is drawn inward, gathering its load, the cleaners L drag idly behind said head. When the limit of the inward movement is reached, a short reverse movement, first, causes the rear ends of the cleaners L to engage the earth, then the upper ends thereof to swing outward carrying the head A with them, and the teeth D clear of the ground. This action forces the cleaners L respectively, forward or inward between the teeth D, completely removing the hay or grass from the latter; also when the rake is lifted from the ground, if necessary, any slight reciprocal movement of the head A will cause the cleaners L to swing respectively between the teeth D, driving accumulations from between the latter.

What I claim as my invention, and desire to secure by Letters Patent of the United States, is—

1. The combination of the rake head A, provided with the looped teeth D, and the pendants L pivotally seated in said head between said teeth, respectively, and adapted to be forced between said teeth to dislodge the gathered material therefrom; substantially as shown, and for the purpose described.

2. The combination of the rake head A, looped teeth D seated therein, rod J seated in said head between the limbs of said rake teeth, and pendants L pivotally suspended upon said rod between said teeth respectively, substantially as shown and for the purpose described.

In testimony whereof I affix my signature in presence of two witnesses.

THOMAS A. GALT.

Witnesses:
JOHN G. MANAHAN,
CHATTIE L. MANAHAN.